(12) United States Patent
Chen et al.

(10) Patent No.: US 8,281,295 B2
(45) Date of Patent: *Oct. 2, 2012

(54) COMPUTER ANALYSIS AND RUNTIME COHERENCY CHECKING

(75) Inventors: Tong Chen, Yorktown Heights, NY (US); Haibo Lin, Beijing (CN); John K. O'Brien, South Salem, NY (US); Tao Zhang, Duluth, GA (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

This patent is subject to a terminal disclaimer.

(21) Appl. No.: 12/125,982

(22) Filed: May 23, 2008

(65) Prior Publication Data

US 2009/0293048 A1 Nov. 26, 2009

(51) Int. Cl.
*G06F 9/45* (2006.01)
(52) U.S. Cl. .................................. 717/151; 711/147
(58) Field of Classification Search ........... 717/151–161
See application file for complete search history.

(56) References Cited

U.S. PATENT DOCUMENTS

| | | | |
|---|---|---|---|
| 5,146,589 A * | 9/1992 | Peet et al. | 714/3 |
| 5,555,398 A | 9/1996 | Raman | |
| 5,579,520 A | 11/1996 | Bennett | |
| 5,909,580 A | 6/1999 | Crelier et al. | |
| 6,249,520 B1 | 6/2001 | Steely, Jr. et al. | |
| 6,263,406 B1 * | 7/2001 | Uwano et al. | 711/141 |
| 6,336,154 B1 | 1/2002 | McCarthy et al. | |
| 6,516,462 B1 | 2/2003 | Okunev et al. | |
| 6,598,128 B1 * | 7/2003 | Yoshioka et al. | 711/144 |
| 6,651,115 B2 | 11/2003 | Anderson | |
| 6,665,671 B2 * | 12/2003 | Coutant | 1/1 |
| 6,718,294 B1 | 4/2004 | Bortfeld | |
| 6,901,587 B2 | 5/2005 | Kramskoy et al. | |
| 7,107,583 B2 * | 9/2006 | Hobbs et al. | 717/150 |
| 7,210,122 B2 | 4/2007 | Shuf et al. | |
| 7,380,086 B2 | 5/2008 | Archambault et al. | |
| 7,411,694 B2 | 8/2008 | Nomizu | |
| 7,747,989 B1 | 6/2010 | Kissell | |

(Continued)

OTHER PUBLICATIONS

Kim et al., "Multiplex: Unifying Conventional and Speculative Thread-Level Parallelism on a Chip Multiprocessor", School of Electrical and Computer Engineering, Purdue University, 23 pages.

(Continued)

*Primary Examiner* — Wei Zhen
*Assistant Examiner* — Brahim Bourzik
(74) *Attorney, Agent, or Firm* — Francis Lammes; Stephen J. Walder, Jr.; Matthew B. Talpis

(57) ABSTRACT

Compiler analysis and runtime coherency checking for reducing coherency problems is provided. Source code is analyzed to identify at least one of a plurality of loops that contains a memory reference. A determination is made as to whether the memory reference is an access to a global memory that should be handled by at least one of a software controlled cache or a direct buffer. A determination is made as to whether there is a data dependence between the memory reference and at least one reference from at least one of other direct buffers or other software controlled caches in response to an indication that the memory reference is an access to the global memory that should be handled by either the software controlled cache or the direct buffer. A direct buffer transformation is applied to the memory reference in response to a negative indication of the data dependence.

20 Claims, 7 Drawing Sheets

U.S. PATENT DOCUMENTS

| | | |
|---|---|---|
| 2002/0169900 A1* | 11/2002 | Hiji ................................ 710/22 |
| 2004/0093467 A1 | 5/2004 | Shen et al. |
| 2004/0205740 A1* | 10/2004 | Lavery et al. ................. 717/151 |
| 2005/0223359 A1 | 10/2005 | Rao Nagaraju et al. |
| 2005/0246700 A1 | 11/2005 | Archambault et al. |
| 2006/0070054 A1 | 3/2006 | Naik et al. |
| 2006/0136878 A1 | 6/2006 | Raghunath et al. |
| 2006/0155935 A1 | 7/2006 | Jones et al. |
| 2006/0179174 A1 | 8/2006 | Bockhaus et al. |
| 2006/0259691 A1 | 11/2006 | Jeremiassen |
| 2006/0265555 A1 | 11/2006 | Davis et al. |
| 2007/0038987 A1 | 2/2007 | Ohara et al. |
| 2007/0079073 A1 | 4/2007 | Rosenbluth et al. |
| 2007/0101318 A1 | 5/2007 | Tatsuoka et al. |
| 2007/0124732 A1 | 5/2007 | Lia et al. |
| 2007/0156986 A1 | 7/2007 | Neiger et al. |
| 2007/0208908 A1 | 9/2007 | Moore et al. |
| 2007/0226718 A1 | 9/2007 | Watanabe |
| 2007/0261042 A1 | 11/2007 | Chen et al. |
| 2009/0216957 A1 | 8/2009 | Chaussade et al. |

OTHER PUBLICATIONS

U.S. Appl. No. 12/177,507, filed Jul. 22, 2008, Chen et al.
U.S. Appl. No. 12/125,167, filed May 22, 2008, Chen et al.
USPTO U.S. Appl. No. 12/125,167, Jan. 17, 2012, 1 page.
Uspto U.S. Appl. No. 12/177,507, Jan. 27, 2012, 1 page.
Notice of Allowance mailed May 14, 2012 for U.S. Appl. No. 12/177,507, 23 pages.
Office Action mailed Apr. 9, 2012 for U.S. Appl. No. 12/125,167, 29 pages.
Interview Summary mailed Jul. 5, 2012 for U.S. Appl. No. 12/125,167, 3 pages.
Response to Office Action filed Jul. 9, 2012, U.S. Appl. No. 12/125,167, 23 pages.

* cited by examiner

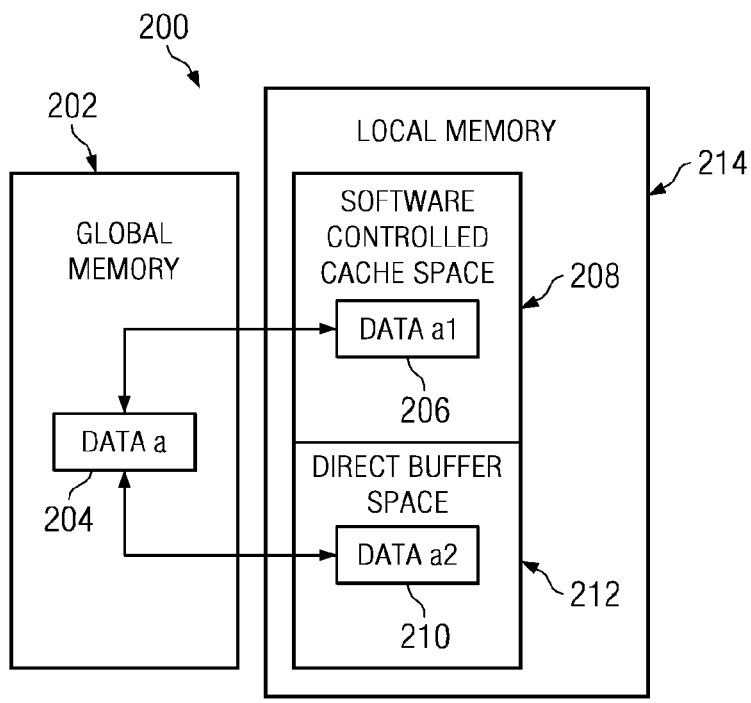
FIG. 2
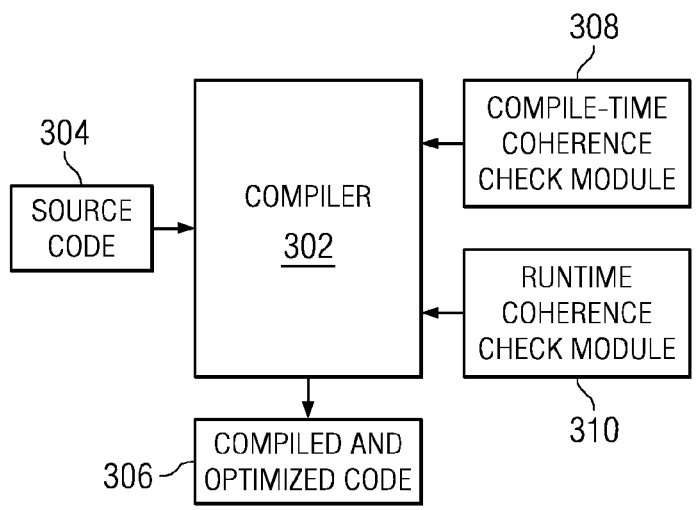
FIG. 3
```
/* A and B are in system memory */
/* S is a scalar residing in local store */
for(i=0; i<N; i++) {
        B[i] = A[i] * S;
}
```
FIG. 4A

```
402
┌─────────────────────────────┐
│ for(ii=0; ii<N; ii+=bf) {   │
│     n = min(ii+bf, N);      │
│     DMA get A[ii:n] to tA;  │
│     for(i=ii; i<n; i++) {   │
│         tB[i] = tA[i] * S;  │
│     }                       │
│     DMA put tB to B[ii:n];  │
│ }                           │
└─────────────────────────────┘
```

*FIG. 4B*

```
                                500
      ┌──────────────────────────────────────────┐
      │ /* A[foo(i)] accessed by software cache */│
  502 │ for(i=0; i<N; i++) {                      │
      │     A[foo(i)] = T;                        │
      │ }                                         │
      │                                           │
      │ /* A[i] accessed by direct buffering */   │
  504 │ for(i=0; i<N; i++) {                      │
      │     B[i] = A[i] *S;                       │
      │ }                                         │
      └──────────────────────────────────────────┘
```

*FIG. 5A*

```
                                506
      ┌──────────────────────────────────────────┐
      │ /* A[foo(i)] accessed by software cache */│
      │ for(i=0; i<N; i++) {                      │
  508 │     cache lookup A[foo(i)];               │
      │     if miss, DMA A[] to cache;            │
      │     A[foo(i)] = T;                        │
      │ }                                         │
      │                                           │
      │ /* A[i] accessed by direct buffering */   │
      │ for (ii=0; ii<N; ii+=bf) {                │
      │     n = min(ii+bf, N);                    │
  510 │     DMA get A[ii:n] to tA;                │
      │     for(i=ii; i<n; i++) {                 │
      │         tB[i] = tA[i] * S;                │
      │     }                                     │
      │     DMA put tB to B[ii:n];                │
      │ }                                         │
      └──────────────────────────────────────────┘
```

*FIG. 5B*

```
600
┌─────────────────────────────────┐
│ for(ii=0; ii<N; ii+=bf) {       │
│     n = min(ii I bf, N);        │
│     DMA get A[ii:n] to tA;      │
│     Coherence maintenance for A;│
│     for(i=ii; i<n; i++) {       │
│         tB[i] = tA[i] * S;      │
│     }                           │
│     DMA put tB to B[ii:n];      │
│     Coherence maintenance for B;│
│ }                               │
└─────────────────────────────────┘
```

*FIG. 6*

```
for(ii=0; ii<N; ii+=bf) {
    n = min(ii+bf, N);
    Issue DMA get A[ii:n] to tA, record DMA info;
    DMA_wait_and_coherence();
    for(i=ii; i<n; i++) {
        tB[i] = tA[i] * S;
    }
    Issue DMA put tB to B[ii:n], record DMA info;
}
```

COMPUTER ANALYSIS AND RUNTIME COHERENCY CHECKING

BACKGROUND OF THE INVENTION

1. Field of the Invention

The present application relates generally to an improved data processing apparatus and method and more specifically to an apparatus and method for compiler analysis and runtime coherency checking.

2. Background of the Invention

In heterogeneous multi-core systems, reducing hardware complexity and minimizing power consumption are important design considerations. Providing each of the accelerator cores in such systems with its own fast local memory is one means of accomplishing this goal. Typically, such systems will not provide hardware supported coherence between these local memories and the global system memory. When an application (both code and data) fit within the local memory, good performance can be guaranteed. Such a feature is critical for real time applications. The Cell Broadband Engine Architecture (CBEA) is one example of such a heterogeneous multi-core system. The CBEA includes on a chip a PPE core, and 8 SPE cores each with 256 KB fast local memory, as well as a globally coherent direct memory access (DMA) engine for transferring data between local memories and the shared system memory. Scratchpad memory in embedded computing systems is another example of this type of memory hierarchy. This memory design requires careful programming to use the fast local memory efficiently and reduce long latency accesses to the global memory so as to obtain top performance.

BRIEF SUMMARY OF THE INVENTION

In one illustrative embodiment, a method, in a data processing system, is provided for reducing coherency problems. The illustrative embodiments receive source code that is to be compiled. The illustrative embodiments analyze the source code to identify at least one of a plurality of loops that contains a memory reference. The illustrative embodiments determine whether the memory reference is an access to a global memory that should be handled by at least one of a software controlled cache or a direct buffer. Responsive to an indication that the memory reference is an access to the global memory that should be handled by at least one of the software controlled cache or the direct buffer, the illustrative embodiments determine whether there is a data dependence between the memory reference and at least one reference from at least one of other direct buffers or other software controlled caches. Responsive to a negative indication of the data dependence, the illustrative embodiments apply a direct buffer transformation to the memory reference.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to, those of ordinary skill in the art in view of the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof will best be understood by reference to the following detailed description of illustrative embodiments when read in conjunction with the accompanying drawings, wherein:

FIG. 2 depicts an exemplary data transfer diagram in accordance with an illustrative embodiment;

FIG. 3 depicts an exemplary operation of a compiler that compiles data used by an application in accordance with an illustrative embodiment;

FIG. 4A depicts exemplary pseudo code in accordance with an illustrative embodiment;

FIG. 4B depicts modified pseudo code after direct buffering transformation has beers applied to pseudo code in accordance with an illustrative embodiment;

FIG. 5A depicts exemplary pseudo code before direct buffering and software controlled caching in accordance with an illustrative embodiment;

FIG. 5B depicts modified pseudo code after direct buffering and software controlled caching transformations have been applied in accordance with an illustrative embodiment;

FIG. 6 depicts high-level pseudo code illustrating coherence maintenance in accordance with an illustrative embodiment;

DETAILED DESCRIPTION OF THE INVENTION

Figure 1:
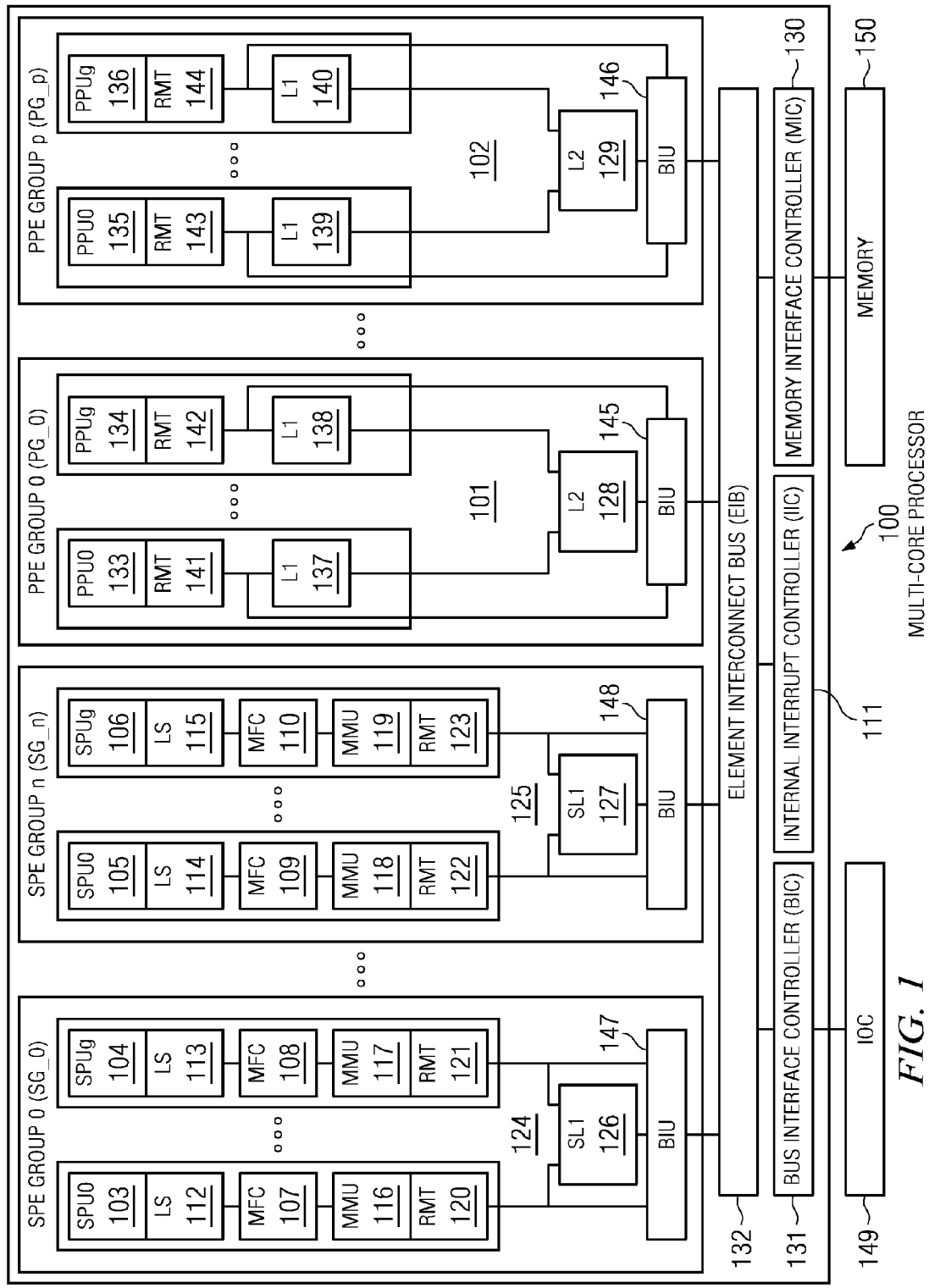
FIG. 1 depicts an exemplary diagram of a heterogeneous multi-core processor in which aspects of the illustrative embodiments may be implemented in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems), and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The illustrative embodiments provide a mechanism for compiler analysts and runtime coherency checking. Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as exemplary environments in which exemplary aspects of the illustrative embodiments may be implemented. While the description following FIG. 1 will focus primarily on a single data processing device implementation for prefetching irregular data references for software controller caches, this is only exemplary and is not intended to state or imply any limitation with regard to the features of the present invention. To the contrary, the illustrative embodiments are intended to include distributed data processing environments and embodiments in which irregular data references are prefetched for software controller caches.

With reference now to the figures and in particular with reference to FIG. 1, exemplary diagrams of data processing environments are provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to the figures and in particular with reference to FIG. 1, an exemplary diagram of a heterogeneous multi-core processor is shown in which aspects of the illustrative embodiments may be implemented in accordance with an illustrative embodiment. This example of a heterogeneous multi-core processor is compliant with the Cell Broadband Engine™ architecture jointly developed by IBM, Sony Computer Entertainment Inc., and Toshiba. Cell Broadband Engine is a trademark of Sony Computer Entertainment Corporation. Multi-core processor 100 may consist of a single chip, a multi-chip module (or modules), or multiple single-chip modules on a motherboard or other second-level package, depending on the technology used and the cost/performance characteristics of the intended design point directed toward distributed processing targeted for media-rich applications such as game consoles, desktop systems, and servers.

Logically, multi-core processor 100 defines four separate types of functional components: Power PC® processor element (PPE) 101 or 102, synergistic processor units (SPU) 103, 104, 105, or 106, memory flow controller (MFC) 107, 108, 109, or 110, and internal interrupt controller (IIC) 111. The computational units in multi-core processor 100 are PPEs 101 and 102 and SPUs 103, 104, 105, and 106. Each of SPUs 103, 104, 105, and 106 has dedicated local storage (LS) 112, 113, 114, or 115, a dedicated MFC 107, 108, 109, or 110 with its associated memory management unit (MMU) 116, 117, 118, or 119, and replacement management table (RMT) 120, 121, 122, or 123, respectively. The combination of these components is referred to as SPU element (SPE) group 124 or 125.

Multi-core processor 100 depicts SPE groups 124 and 125 that share a single SL1 cache 126 and 127, respectively. An SL1 cache is a first-level cache for direct memory access transfers between local storage and main storage. PPE groups 101 and 102 share single second-level (L2) caches 128 and 129, respectively. While caches are shown for the SPE groups 124 and 125 and PPE groups 101 and 102, they are considered optional in the CBEA. Also included in FIG. 1 are two controllers typically found in a processor: memory interface controller (MIC) 130 and bus interface controller (BIC) 131. MIC 130 provides access to memory 150 for multi-core processor 100. BIC 131 provides an input/output interface to input/output controller (IOC) 149 for multi-core processor 100. Connecting the various units within the processor is element interconnect bus (EIB) 132. Since the requirements for the MIC 130, BIC 131, and EIB 132 vary widely between implementations, the definition for these units are beyond the scope of the CBEA.

Multi-core processor 100 may include multiple groups of Power PC® processor elements (PPE groups), such as PPE group 101 or 102, and multiple groups of synergistic processor elements (SPE groups), such as SPE group 124 or 125. Hardware resources may be shared between units within a group. However, SPE groups 124 and 125 and PPE groups 101 and 102 appears to software as independent elements.

Each of SPUs 103, 104, 105, and 106 in SPE groups 124 and 125 has its own local storage area 112, 113, 114, or 115 and dedicated MFC 107, 108, 109, or 110 that includes an associated MMU 116, 117, 118, or 119, which can hold and process memory-protection and access-permission information.

Multi-core processor 100 includes one or more of PPE group 101 or 102. PPE groups 101 and 102 consist of 64-bit Power PC® processor units (PPUs) 133, 134, 135, and 136 with associated L1 caches 137, 138, 139, and 140, respectively. Multi-core processor 100 system includes a vector multimedia extension unit (not shown) in the PPE groups 101 and 102. PPE groups 101 and 102 also contain replacement management table (RMT) 141, 142, 143, and 144 and bus interlace unit (BIU) 145 and 146, respectively. BIUs 145 and 146 connect PPE groups 101 or 102 to the EIB 132. BIUs 147 and 148 connect RMTs 120, 121, 122, and 123 to EIB 132.

PPE groups 101 and 102 are general-purpose processing units, which can access system management resources, such as the memory-protection tables, for example. Hardware resources defined in the CBEA are mapped explicitly to the real address space as seen by PPE groups 101 and 102. Therefore, any PPE groups 101 and 102 may address any of these resources directly by using an appropriate effective address value. A primary function of PPE groups 101 and 102 is the management and allocation of tasks for the SPE groups 124 and 125 in a system.

Multi-core processor 100 includes one or more SPUs 103, 104, 105, or 106. SPUs 103, 104, 105, and 106 are less complex computational units than PPE groups 101 and 102, in that they do not perform any system management functions. SPUs 103, 104, 105, and 106 have a single instruction multiple data (SIMD) capability and typically process data and initiate any required data transfers, subject to access properties set up by PPE groups 101 and 102, in order to perform their allocated tasks.

The purpose of SPUs 103, 104, 105, and 106 is to enable applications that require a higher computational unit density and may effectively use the provided instruction set. A significant number of SPUs 103, 104, 105, and 106 in a system, managed by PPE group 101 or 102, allow for cost-effective processing over a wide range of applications.

MFCs 107, 108, 109, and 110 are essentially the data transfer engines. MFCs 107, 108, 109, and 110 provide the primary method for data transfer, protection, and synchronization between main storage and the local storage. MFCs 107, 108, 109, and 110 commands describe the transfer to be performed. A principal architectural objective of MFCs 107, 108, 109, and 110 is to perform these data transfer operations in as fast and as fair a manner as possible, thereby maximizing the overall throughput of multi-core processor 100.

Commands that transfer data are referred to as MFC direct memory access commands. These commands are converted into direct memory access transfers between the local storage domain and main storage domain. Each of MFCs 107, 108, 109, and 110 may typically support multiple direct memory access transfers at the same time and may maintain and process multiple MFC commands.

In order to accomplish this, MFCs 107, 108, 109, and 110 maintain and process queues of MFC commands. Each of MFCs 107, 108, 109, and 110 provide one queue for the associated SPU 103, 104, 105, or 106, MFC SPU command queue, and one queue for other processors and devices, MFC proxy command queue. Logically, a set of MFC queues is always associated with each SPU 103, 104, 105, or 106 in multi-core processor 100, but some implementations of the architecture may share a single physical MFC between multiple SPUs. In such cases, all the MFC facilities appear to software as independent for each SPU 103, 104, 105, or 106.

Each MFC direct memory access data transfer command request involves both a local storage address (LSA) and an effective address (EA). The local storage address can directly address only the local storage area of its associated SPU 103, 104, 105, or 106. The effective address has a more general application, in that it can reference main storage, including all the SPU local storage areas, if they are aliased into the real address space.

MFCs 107, 108, 109, and 110 present two types of interfaces: one to the SPUs 103, 104, 105, and 106 and another to all other processors and devices in a processing group.

SPU channel: The SPUs 103, 104, 105, and 106 use a channel interface to control MFCs 107, 108, 109, and 110. In this case, code running on SPUs 103, 104, 105, and 106 can only access the MFC SPU command queue for that SPU 103, 104, 105, or 106.

Memory-Mapped Register: Other processors and devices control MFC 107, 108, 109, and 110 by using memory-mapped registers. It is possible for any processor and device in the system to control MFCs 107, 108, 109, or 110 and to issue MFC proxy command requests on behalf of SPU 103, 104, 105, or 106.

MFCs 107, 108, 109, and 110 also support bandwidth reservation and data synchronization features.

IIC 111 manages the priority of the interrupts presented to PPE groups 101 and 102. The main purpose of IIC 111 is to allow interrupts from the other components in the processor to be handled without using the main system interrupt controller. IIC 111 is really a second level controller. IIC 111 is intended to handle all interrupts internal to a multi-core processor 100 or within a multiprocessor system of multi-core processor 100. The system interrupt controller will typically handle all interrupts external to multi-core processor 100.

In a multi-core system, software checks IIC 111 to determine if the interrupt was sourced from an external system interrupt controller. IIC 111 is not intended to replace the main system interrupt controller for handling interrupts from all I/O devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Generally, there are two common strategies to manage the local memory to run programs with large data sets: software controlled caching and direct buffering. In software controlled cache, a portion of the local memory is allocated for cache lines. Every load/store to global memory is instrumented with cache related instructions to go through software controlled cache lookup operations and miss handling (if needed) at runtime. A software controlled cache may be able to handle all data references uniformly through the cache and capture any data reuse that occurs. However, using a software controlled cache is typically an expensive approach, and in practice software controlled caches require additional techniques in order to provide reasonable performance.

In direct buffering, a compiler allocates temporary buffers data in the local memory and inserts data transfer operations to move data between the local buffer and global memory. Each load/store to global memory is then replaced with the direct load/store to the buffer at compile time. As a result, both the software controlled cache lookup and miss handling cost may be eliminated. The size of DMA transfer chunks may be adapted to the application instead of being determined by the fixed cache line length. Direct buffering is usually combined with loop strip mining to limit the size of the local buffer required. Since the mapping of references between global memory and local buffers is done statically, direct buffering is only applicable on references with known dependences, such as those with regular data accesses in loop nests with clear aliasing and data dependence information. Unclear aliasing or data dependences present difficulties for direct buffering techniques, such that reuse opportunities may be lost. The worst case for direct buffering is that a buffer is allocated, used for only one reference, and then freed. In this case, opportunities may be lost for both temporal and spatial data reuse.

Thus, it may be desirable to apply both software controlled cache and direct buffering as appropriate, especially on large complicated applications. Some known approaches select either software controlled cache or direct buffering, based on the characteristics of the applications. But for a large application, some references may be suitable for software controlled cache while the others may be handled more efficiently by direct buffering. From a compiler implementation point of view, the compiler developer may target the direct buffering techniques only on regular references and use software controlled cache as the fall-back solution for irregular references. However, the integration of software controlled cache and direct buffering may create data coherence problems between the cache line and the local buffers allocated for use by direct buffering, because the same data in the global memory may have two copies in the local memory. If one copy is modified, the other will have to be updated properly.

FIG. 2 depicts an exemplary data transfer diagram in accordance with an illustrative embodiment. In data transfer 200, global memory 202 contains data a 204. Also in data transfer 200, data a 204 has two copies; data a1 206 in software controlled cache 208 and data a2 210 in direct buffer 212. In data transfer 200, both software controlled cache 208 and direct buffer 212 are located within local memory 214. If, for example, data a1 206 in software controlled cache 208, is modified, then the data a2 210 in direct buffer 212 would contain an obsolete value. Further, if a read of data a2 210 were requested, then the read of data a2 210 would return an incorrect result. Thus, in this example, a coherency problem exists between the two copies of data, data a1 206 and data a2 210 within local memory 214 of a single thread. This coherency problem is orthogonal to the coherence issues among different threads.

The illustrative embodiments provide mechanisms to eliminate coherency problems using compile time analysis and runtime coherency maintenance. The illustrative embodiments may use compiler analysis to guarantee that there is no access to software controlled cache after a direct buffer is allocated and before it is freed, and rely on runtime support to update values from or to software controlled cache at the point when the direct buffer is allocated or freed. Further, the illustrative embodiments may use a global data flow analysis designed to eliminate redundant coherence maintenance, and overlap computation and DMA accesses to reduce runtime overhead. The illustrative embodiments may be implemented in a single source compiler for a Cell Broadband Engine Architecture (CBEA), such as multi-core processor 100.

The illustrative embodiments have several major advantages. One advantage is that there is no extra overhead on existing software controlled cache and direct buffer references. That is, the overhead is added only at the point when a direct buffer is allocated or freed, and such overhead may be hidden by carefully overlapping the coherence checking with DMA transfers. In addition, the global data flow analysis may reduce the number of runtime coherency maintenance checks that are needed. Since the decision for direct buffering may now be made locally as per each loop nest, the compiler implementation is simplified. Further, optimization opportunities will not be lost even if references at other places in the program may not be optimized by direct buffering. Finally, the local decision making may also provide a clean interface for a user to interact with compiler.

FIG. 3 depicts an exemplary operation of a compiler that compiles data used by an application in accordance with an illustrative embodiment. A compiler is a computer program that translates a series of statements written for one application program in one computer language, commonly called source code, into a resulting output in another computer language, commonly called the object or target code.

Extracting performance from heterogeneous processors, such as multi-core processor 100, presents a number of challenges for the average and even sometimes experienced programmers. To ease the programming for the Cell Broadband Engine Architecture (CBEA), a single source compiler, such as compiler 302, abstracts the architectural complexity of the heterogeneous processor and boost programmability. Compiler 302 receives source coded 304 that may include one or more source files with shared memory programming model. Guided by user directives, compiler 302 outlines parallelizable code sections into separate functions and compiles source code 304 to provide compiled and optimized code 306 for one or more processing elements in the computing system. Compiler 302 may also prepare for data transfers between global memory and local memory associated with the processing element. That is, compiler 302 may identify accesses in processing element functions that refer to data in global memory locations and use either software controlled cache or direct buffering to manage the data transfers. Compiler 302 may also manage code size by partitioning source code 304 into manageable chunks and using code overlay support to transfer code at runtime.

Software controlled cache is the basic mechanism for data management in our compiler 302. Software controlled cache works in a similar way to a hardware data cache, but is implemented by compiler transformations. Compiler 302 replaces loads and stores to global memory in the processing element code with instructions that explicitly look up the effective address in the directory of the software controlled cache. If a cache line for the effective address is found in the directory, which may also be referred to as a cache hit, compiler 302 uses the value in the software controlled cache. Otherwise, if a cache line for the effective address is not found in the directory, which may be referred to as a cache miss, compiler 302 allocates a line in the cache either by using an empty line or by replacing an existing one. Then, for a load, compiler 302 issues a DMA gel operation to read the data from global memory to the cache line. For stores, compiler 302 writes the data to the cache and maintains dirty bits to record which bytes are actually modified. Later, compiler 302 merges the modified data back to global memory using atomic update operations, either when the cache line is evicted to make space for other data or when a cache flush is invoked in the code based on semantics.

Software controlled cache is expensive and incurs significant runtime overhead due to the cache lookup and miss handling cost. Some data references are regular references from the point-of-view of compiler optimizations. These regular references occur within a loop, where the memory addresses that the regular references refer to may be expressed using affine expressions of loop induction variables. For such regular accesses to shared data, the illustrative embodiments avoid using software controlled cache and apply direct buffering. Direct buffering allocates temporary local buffers in local memory for the regularly accessed data. For read references, compiler 302 initializes the buffer with a DMA get operation before the loop executes. For write references, compiler 302 writes out the data from the buffer using a DMA put operation after the loop finishes execution. Compiler 302 statically generates these DMA get and DMA put operations. Compiler 302 also transforms the loop body so that the processing element accesses the local buffer directly without incurring any software controlled cache overhead. Furthermore, DMA operations may be overlapped with computations by using multiple local buffers. Compiler 302 may choose the proper buffering scheme and buffer size to optimize execution time and space.

FIG. 4A depicts exemplary pseudo code 400 in accordance with an illustrative embodiment. FIG. 4B depicts modified pseudo code 402 after direct buffering transformation has been applied to pseudo code 400 in accordance with an illustrative embodiment. Modified pseudo code 402 illustrates that direct buffering first tiles the loop to partition the loop iteration space into smaller blocks and limits the size of local buffer required, then inserts proper DMA operations, and at last transforms references inside the loop body to local buffers.

Both direct buffering and software controlled caching have pros and cons, and, thus, the application of direct buffering and software controlled caching may best be considered on a reference by reference basis. Therefore, compiler 302 in FIG. 3 may optimize some references to a variable at a certain point in the program by direct buttering while other references to the same variable may be optimized by software controlled caching. Thus, a data coherence problem may occur, i.e., the same data could reside in both local buffers created by direct buffering and software controlled caching. The coherence between software controlled cache and local buffers has to be maintained to ensure correctness.

FIG. 5A depicts exemplary pseudo code 500 before direct buffering and software controlled caching in accordance with an illustrative embodiment. In loop 502, the access to array A is irregular; thus, array A may be accessed through software controlled cache. In loop 504, the access to array A is regular; thus, array A may be accessed using direct buffering.

FIG. 5B depicts modified pseudo code 506 after direct buffering and software controlled caching transformations have been applied in accordance with an illustrative embodiment. After the execution of loop 508, some elements of array A may have been modified in software controlled cache and not evicted to global memory yet. During the execution of loop 510, when direct buffering attempts to access array A from global memory using DMA operations, direct buffering may result in the access of stale values from the global memory. A similar problem may occur when direct buffering writes data back to the global memory. If the same data already exists in the software controlled cache, DMA write operations from the direct buffer to the global memory may not update the stale values in the software controlled cache. If the application accesses the data through the software controlled cache, the application may result in accessing obsolete values.

Returning to FIG. 3, the illustrative embodiments combine compiler analysis and runtime coherence maintenance. Compiler 302 uses compile-time coherence check module 308 and runtime coherence check module 310 to perform compiler analysis and runtime coherence maintenance, respectively. Instead of making a decision in the global scope based only on compiler analysis, compile-time coherence check module 308 applies direct buffering in the unit of a loop nest and decides on whether to optimize each of the references to global memory within the loop nest. Runtime coherence check module 310 operates at the boundary of the direct buffer.

When compiler 302 receives source code 304, compile-time coherence check module 308 analyzes the memory references within the innermost normalized loops in source code 304. For each memory reference, compile-time coherence check module 308 identifies whether the memory reference is an access to global memory that has to be handled by either direct buffering or software controlled caching. If the memory reference has to be handled by either direct buffering or software controlled caching, then compile-time coherence check module 308 determines if there is any data dependence of the memory reference to references from other direct buffers or software controlled caches. If there is data dependence, compile-time coherence check module 308 transforms the memory reference into software controlled cache reference as described above. If there is no data dependence, compile-time coherence check module 308 applies a direct buffer transformation for the memory reference as described above. Compiler 302 then inserts a call into compiled and optimized code 306 that calls the runtime coherence check module 310 at the end of each loop.

Once compiler dependence analysis is applied to enforce coherence between the software controlled cache and direct buffers within the live range of direct buffers, which is the range between the direct buffer's allocation and de-allocation, the focus moves to checking and enforcing coherence for DMA get operations at the beginning of live range of a direct buffer and/or for DMA put operations at the end of the live range of a direct buffer.

In order to perform runtime coherence maintenance, runtime coherence check module 310 performs the following:

For a DMA get operation, after direct buffering issues a DMA get operation from global memory to the direct buffer, runtime coherence check module 310 determines if the data is in the software controlled cache and, if so, determines whether any portion of the data read into the direct buffer has been modified in the software controlled cache. If the data in the software controlled cache has been modified, runtime coherence check module 310 waits for the DMA get operation for the direct buffer to finish and then copies the direct holler with the value in the software controlled cache.

For a DMA put operation, runtime coherence check module 310 determines whether any portion of the data written out from the direct buffer is already in the software controlled cache. If so, runtime coherence check module 310 updates the software controlled cache with the latest values in the direct buffer.

These checks and updates guarantee that direct buffering will read the up-to-date value and the software controlled cache will not read obsolete data. FIG. 6 depicts high-level pseudo code 600 illustrating coherence maintenance in accordance with an illustrative embodiment.

Returning to FIG. 3, the illustrative embodiments recognize that there may be variations in implementing compiler dependence analysis and runtime coherence maintenance. For example, for DMA put operation of the direct buffer, runtime coherence check module 310 may choose to write all values to software controlled cache without checking for a hit or only write those values that are already in software controlled cache. Another example is that, for DMA get operation, runtime coherence check module 310 may check the cache hit first. If there is a cache hit, then it may be possible to issue a small, or even no, DMA get operation if a large portion of data is already in the software controlled cache.

Additionally, the runtime coherence maintenance may be further optimized. First, not all direct buffers need coherence maintenance, for example, the buffered values are not in cache or not referenced by cache later. Second, the maintenance is divided to two phases, one of which is effect address check against software controlled cache and the other is the update with software controlled cache. The check and update may be performed in parallel with DMA transfers using careful overlapping.

Since runtime coherence maintenance is always added outside of the live range of each direct buffer, the approach described above guarantees that direct buffering and software controlled cache work together in harmony without any compiler analysis outside of the loop nest. However, the maintenance may be avoided at some program point if efforts are taken to conduct certain global analysis. For example, if compiler dependence analysis proves that a variable is not in software controlled cache when it is read into a direct buffer, then runtime coherency maintenance for that direct buffer may be eliminated.

A variable becomes live in software controlled cache when the cache line is first brought to cache and is killed when the cache line is replaced or flushed into global memory. At compile time, the point when cache replacement occurs is unknown to compiler 302. However, when a flush operation is encountered, an assumption may be made that the data is not in cache any more. If the flush is a complete flush, then all data is killed from software controlled cache.

A variable's liveliness in cache may also be affected by other variables if they share the same cache line, also known as false sharing. This will generally make it impossible for the compiler to know when the variable becomes live. On the other hand, false sharing may be avoided in compiler implementation by appropriately aligning and padding aggregate variables of interest.

Figures 7, 8:
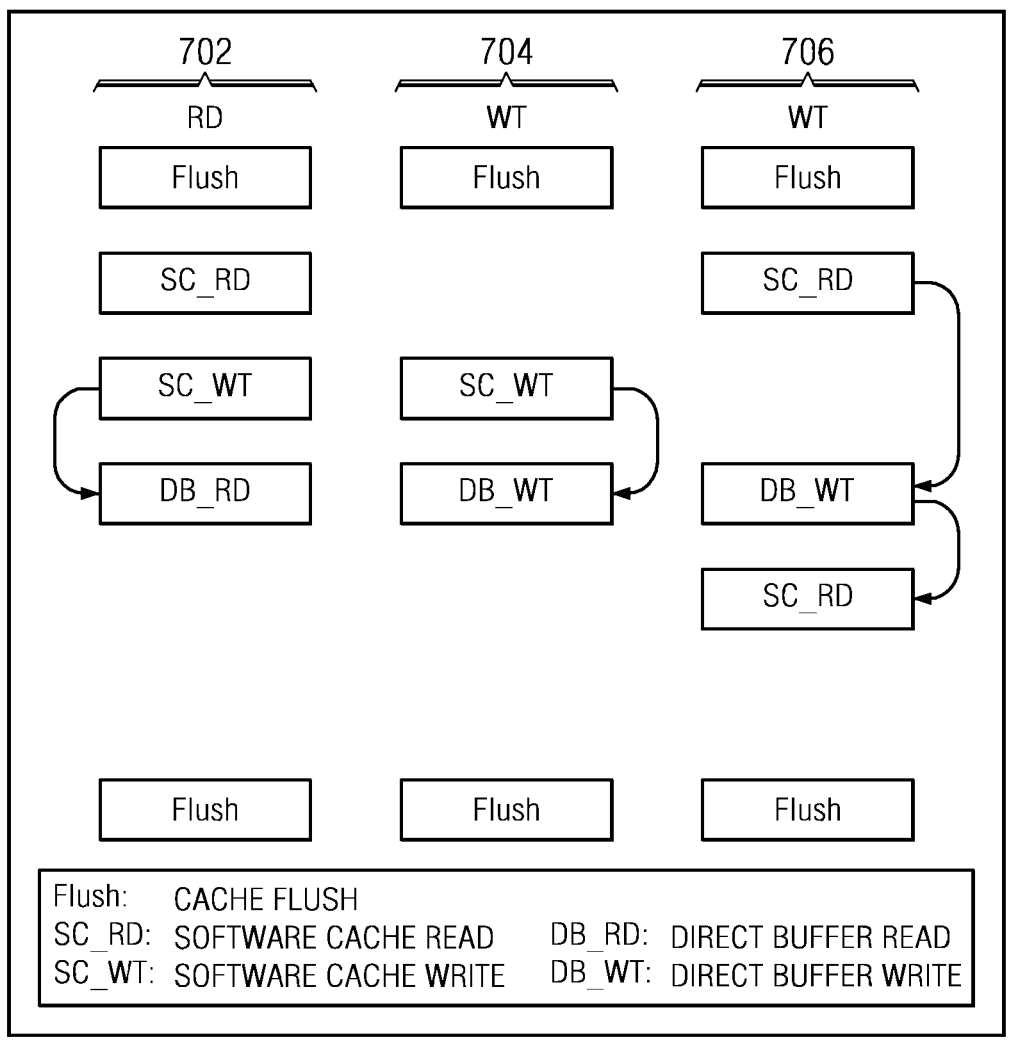
FIG. 7 depicts scenarios for runtime coherence maintenance in accordance with an illustrative embodiment.
FIG. 8 depicts exemplary pseudo code illustrating runtime coherence maintenance in accordance with an illustrative embodiment.

Direct buffering only operates within parallel regions, which are to run in parallel on processing elements. Therefore, direct buffering may always be surrounded by flush operations since a cache flush is mandated at the end of a parallel region. The coherence issue occurs when there are accesses to more than one copy of the same variable and at lease one access is a write access. Assuming no false sharing exists, FIG. 7 depicts scenarios for runtime coherence maintenance in accordance with an illustrative embodiment that may be classified as follows:

For buffer read as depicted in scenario 702, if the direct buffer read reads a value previously modified by a cache write, a runtime coherence check is required. In this case, the software controlled cache may contain updated data which has not been written to global memory. The buffer read needs to refresh its copy after the DMA get operation. If there is only a cache read preceding the buffer read, no runtime coherence check is needed as the data in cache is the same as in system memory.

For a buffer write as depicted in scenario 704, if the buffer write writes a value previously modified by a cache write, a runtime coherence check is required. As the buffer write will update global memory so as to make software controlled cache data stale, the runtime has to either invalidate the software controlled cache, or refresh the software controlled cache. Otherwise, following cache read will hit the stale data, or a flush will dump stale data to global memory, which will violate the memory access order.

For a buffer write as depicted in scenario 706, if the buffer write writes to a value previously read by a software controlled cache and a software controlled cache read follows the buffer write, a runtime coherence check is required. The cache read will bring the cache line in and its value will become obsolete after the direct buffer write. If there is another cache read, the cache read will read the old value in the software controlled cache.

The three cases listed above are necessary conditions to runtime coherence maintenance. To identify the three cases, data flow analysis is used to trace the sequence of the references. The data flow analysis needed here should distinguish the references by how the references are performed, through software controlled caching or direct buffering.

While scenarios 702 and 704 require forward data flow analysis, scenario 706 requires both forward and backward data flow analysis. The backward data flow analysis may be similar to a standard live analysis, except that only the data read through software controlled cache is considered. The forward data flow analysis for the three cases may be merged into one analysis.

Since each data access (DMA get or DMA put operation) only accesses one variable, we can calculate the cache access state of this particular variable along data flow instead of finding the set of all cache assess. It is also easier to define the data flow lattice by focusing on one variable at a time.

In general, a data flow problem can be defined with (F; Y; I). The domain of value V for our problem has three elements with their semantics listed below.
E: not in cache
R: in cache but not modified
W: in cache and modified The partial order for the values are defined, $W \subseteq R \subseteq E$. This partial order defines the meet operator.

The family of the transfer functions F is defined as follows:
For flush node, f1(x)=E.
For cache read node, f2(x)=R, if x is not W.
For cache write node, f3(x)=W.

It can be proven that the transfer function family is monotonic and this data flow problem will converge with iterative traversing. Based on these definitions, inter-procedural data flow analysis may be performed. The output of the cache access propagation is the lattice values to the variable at each buffer node. Assuming that the backwards analysis for the scenario 706 has also been performed, the conditions on which runtime check is needed may be expressed as below.

For buffer read node n, V(n)==W.
For buffer write node n, V(n)==R or W, and the variable is live for software controlled cache.

Based on this analysis, compiler 302 in FIG. 3 passes a flag to runtime coherence check module 310 to indicate whether the coherence check part should be executed or not.

Since the DMA operations may be non-blocking, the runtime coherency check may be carefully overlapped with the DMA operations to hide the overhead. The basic idea is to issue DMA commands as soon as possible and to perform as much as possible coherence checks before the wait for DMA finishes. While overlapping may be performed with single buffering and double buffering, the following example illustrates the process only for single buffering. The runtime coherence maintenance is performed in three steps:

1. For each DMA operation, the parameters needed for runtime coherence maintenance are recorded in a FIFO and then the DMA command is issued.
2. Before the DMA wait operation, runtime coherence maintenance for the write is performed because the update to cache may be executed in parallel with the DMA put operation to global memory, and runtime coherence maintenance For the DMA get operation is pre-run to see whether it is needed. Note that the pre-run just looks up the cache without updating the direct buffer, and records information of the portions of the data already in software controlled cache.
3. After the DMA operation completes, if there is any DMA get operation needing coherence update according to the pre-run, then the actual update from software controlled cache to direct buffer is performed.

FIG. 8 depicts exemplary pseudo code 800 illustrating runtime coherence maintenance in accordance with an illustrative embodiment. In pseudo code 800, the DMA_wait_and_coherence command performs the following:
1. For all DMA writes, check whether the data written is in software controlled cache according to saved DMA info. If the data is in the software controlled cache, update the data in software controlled cache.
2. For all DMA reads, check whether the data read is in software controlled cache according to saved DMA info. Record information of the portions of the data already in software controlled cache.
3. Issue a DMA wait command to wait for all DMA read/write operations issued. The processing element program will be blocked here if the DMA operations are not finished yet.
4. Now according to information saved in step 2, update the local buffer with data values in software controlled cache when necessary.

Thus, steps 1 and 2 are overlapped with DMA read/write operations outside of coherence maintenance function call to reduce runtime overhead.

Figure 9:
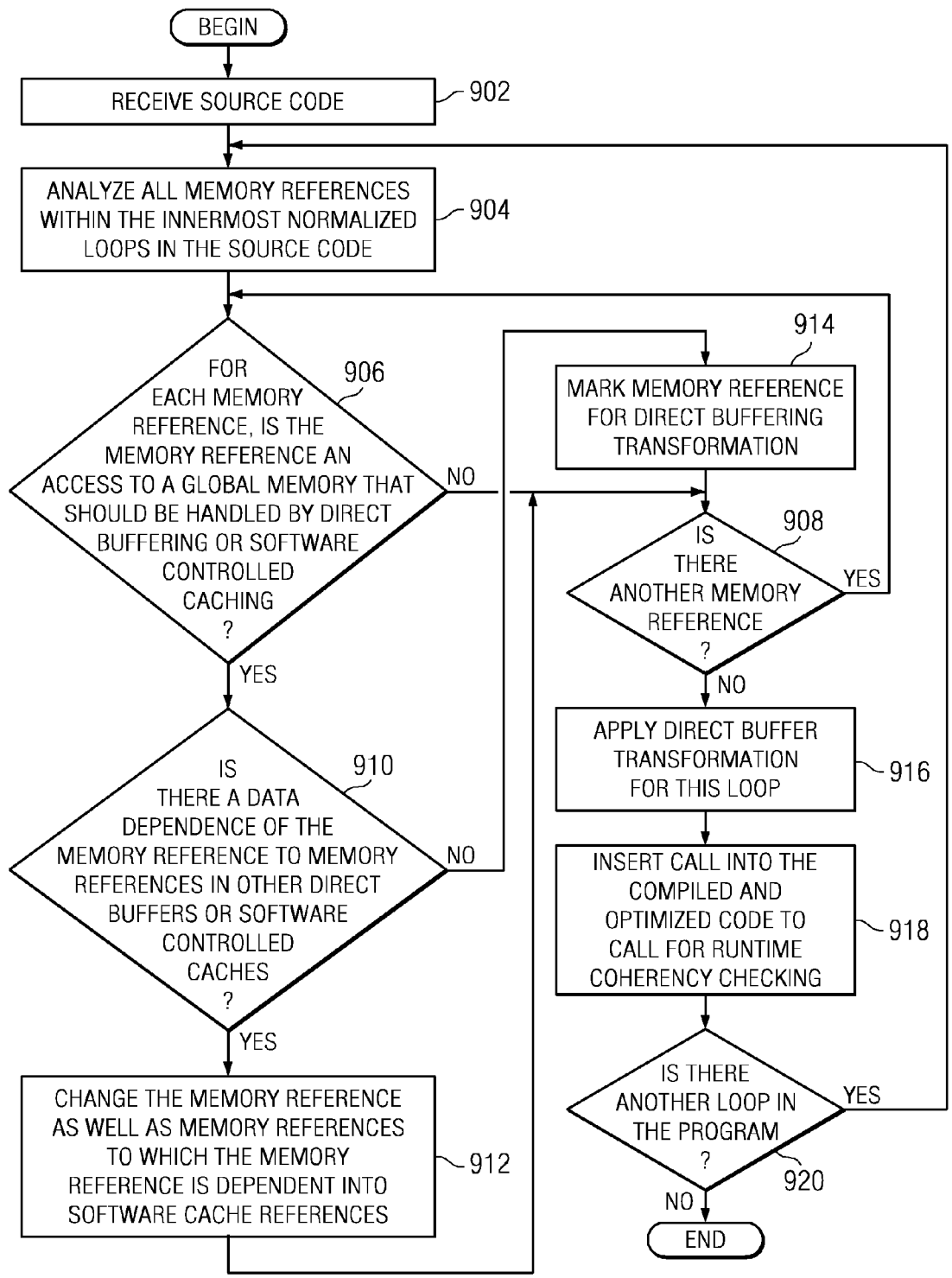
FIG. 9 depicts an exemplary operation for compile-time coherence checking in accordance with an illustrative embodiment.

FIG. 9 depicts an exemplary operation for compile-time coherence checking in accordance with an illustrative embodiment. The compile-time coherence checking applies direct buffering in the unit of a loop nest and decides on whether to optimize each of the references to global memory within the loop nest. As the operation begins, a compiler receives source code that is to be compiled (step 902). The compile-time coherence check module associated with the compiler analyzes the memory references within the innermost normalized loops in source code (step 904). For each memory reference, the compile-time coherence check module identifies whether the memory reference is an access to global memory that should be handled by either direct buffering or software controlled caching (step 906). If at step 906 the memory reference does not require handling by either direct buffering or software controlled caching, then the compile-time coherence check module determines if there is another memory reference (step 908). If at step 908 there is another memory reference, then the operation returns to step 906. If at step 908 there is not another memory reference, then the operation proceeds to step 916.

If at step 906 the memory reference has to be handled by either direct buffering or software controlled caching, then the compile-time coherence check module determines if there is any data dependence of the memory reference to references from other direct buffers or software controlled caches (step 910). If at step 910 there is data dependence, then the compile-time coherence check module transforms the memory reference as well as any memory reference to which the memory reference is dependent into software controlled cache reference (step 912), with the operation proceeding to step 908 thereafter. If at step 910 there is not any data dependence, then the compile-time coherence check module marks the memory reference for direct memory transformation (step 914), with the operation proceeding to step 908 thereafter.

If at step 908 there are not any more memory references to analyze, then the compile-time coherence check module applies a direct buffer transformation for the memory references marked for direct buffer transformation (step 916). The compiler then inserts a call into compiled and optimized code that calls the runtime coherence check module at the end of each loop (step 918). Then the compile-time coherence check module determines if there is another loop in the program (step 920). If at step 920 there is another loop, then the operation proceeds to step 904. If at step 920 there are not any other loops in the program, then the operation ends.

Thus, the compiler dependence analysis is applied to enforce coherence between the software controlled caches and direct buffers within the live range of direct buffers, which is the range between the direct buffer's allocation and de-allocation. Once compiler dependence analysis is complete, then the checking and enforcing of coherence for DMA get operations at the beginning of live range of a direct buffer and/or for DMA put operations at the end of the live range of a direct buffer may be performed.

Figure 10:
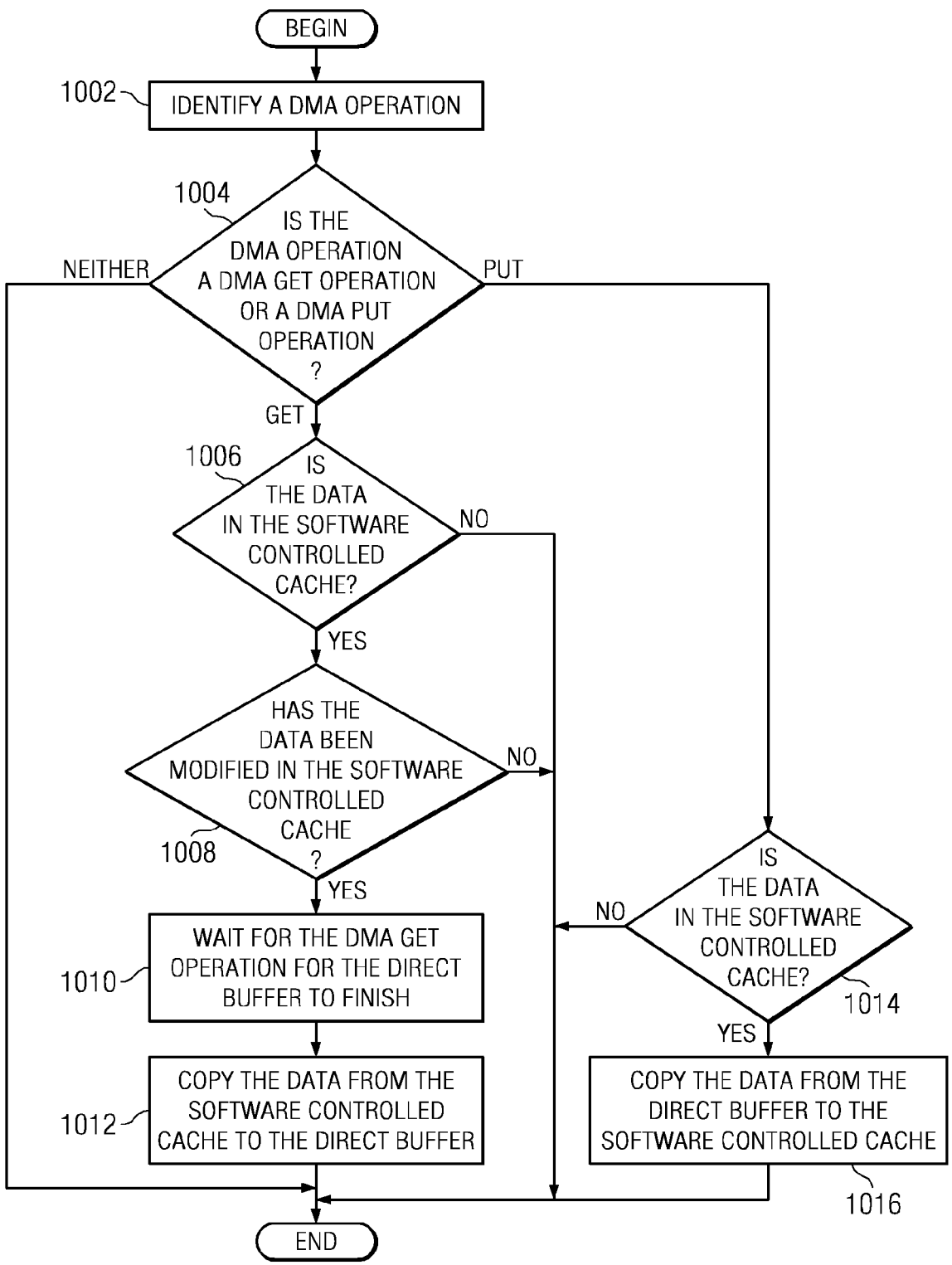
FIG. 10 depicts an exemplary operation of runtime coherence maintenance in accordance with an illustrative embodiment.

FIG. 10 depicts an exemplary operation of runtime coherence maintenance in accordance with an illustrative embodiment. As the operation begins, the runtime coherence check module identifies a direct memory access operation in the executing code (step 1002). The runtime coherence check module determines if the DMA operation is a DMA put operation, a DMA get operation, or some other DMA operation (step 1004). If at step 1004 the DMA operation is neither a DMA put operation nor a DMA get operation, then the operation ends. If at step 1004 the DMA operation is a DMA get operation from global memory to the direct buffer, then the runtime coherence check module determines whether the data that is to be retrieved is already in the software controlled cache (step 1006). If at step 1006 the data is not in the software controlled cache, then the operation ends.

If at step 1006 the data is in the software controlled cache, then the runtime coherence check module determines whether any portion of the data read into the direct buffer has been modified in the software controlled cache (step 1008). If at step 1008 the data in the software controlled cache has not been modified, then the operation ends. If at step 1008 the data in the software controlled cache has been modified, then the runtime coherence check module waits for the DMA get operation for the direct buffer to finish (step 1010) and then copies the data from the software controlled cache to the direct buffer (step 1012), with the operation ending thereafter.

If at step 1004 the DMA operation is a DMA put operation, then the runtime coherence check module determines whether any portion of the data written out from the direct buffer is already in the software controlled cache (step 1014). If at step 1014 the data is not in the software controlled cache, then the operation ends. If at step 1014 the data is in the software controlled cache, then the runtime coherence check module updates the software controlled cache with the latest values in the direct buffer (step 1016), with the operation ending thereafter.

Thus, the checks and updates provided by the runtime coherence check module guarantee that direct buffering will read the up-to-date value and the software controlled cache will not read obsolete data. The illustrative embodiments recognize that there may be variations in implementing compiler dependence analysis and runtime coherence maintenance.

Once again, direct buffering only operates within parallel regions, which are to run in parallel on processing elements; therefore, direct buffering may always be surrounded by flush operations since a cache flush is mandated at the end of a parallel region. The coherence issue occurs when there are accesses to more than one copy of the same variable and at lease one access is a write access.

Figure 11:
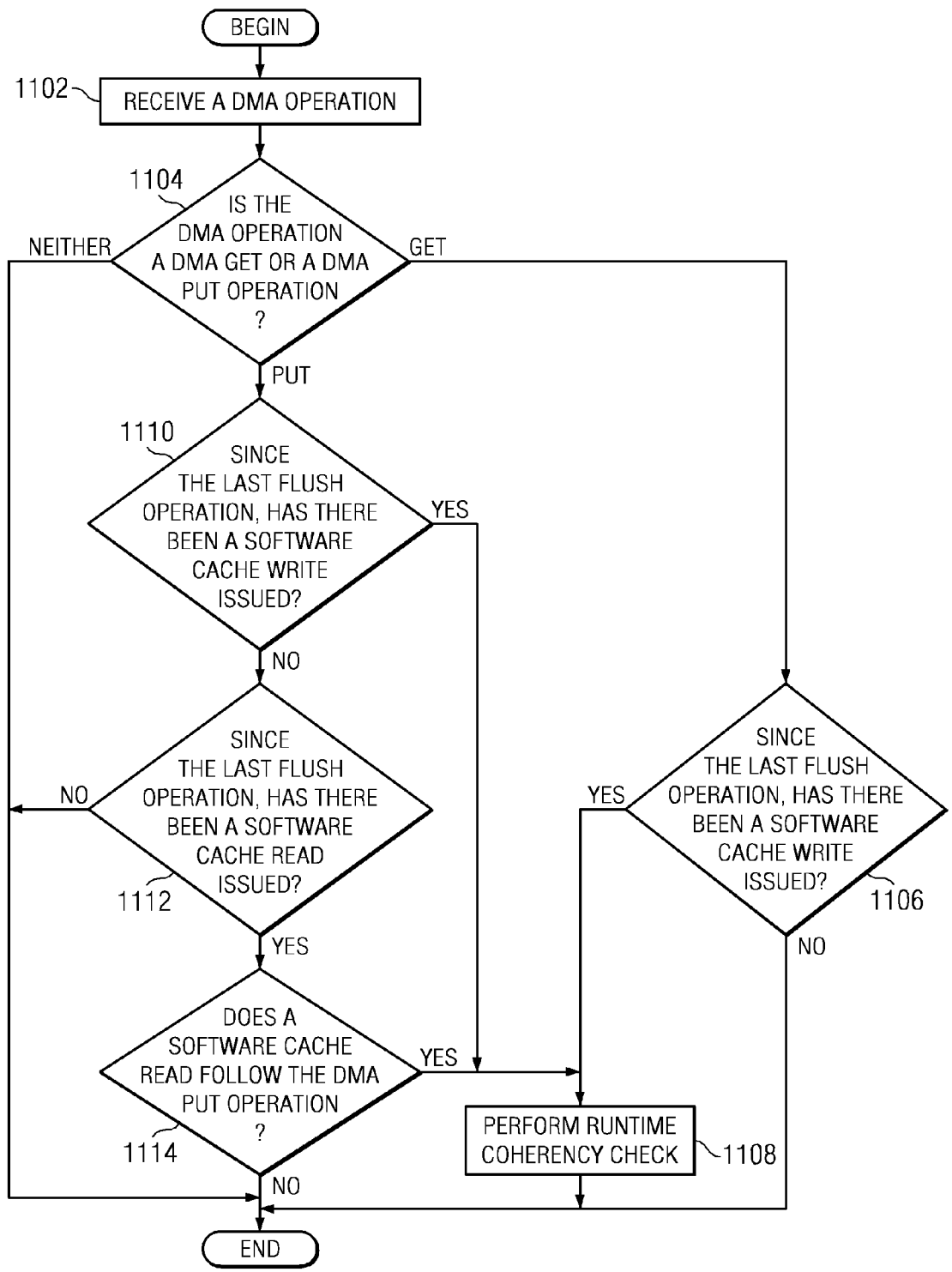
FIG. 11 depicts an exemplary operation for determining whether or not to run the runtime coherence maintenance assuming no false sharing exists in accordance with an illustrative embodiment.

FIG. 11 depicts an exemplary operation for determining whether or not to run the runtime coherence maintenance assuming no false sharing exists in accordance with an illustrative embodiment. As the operation begins, the runtime coherence check module identifies a direct memory access operation in the executing code (step 1102). The runtime coherence check module determines if the DMA operation is a DMA put operation, a DMA get operation, or some other DMA operation (step 1104). If at step 1104 the DMA operation is neither a DMA put operation nor a DMA get operation, then the runtime coherency operation is skipped and the operation ends. If at step 1104 the DMA operation is a DMA get operation from global memory to the direct buffer, then the runtime coherence check module determines since the last flush operation if there has been a software cache write issued (step 1106). If at step 1106 there has not been a software cache write issued, then the operation ends. However, if at step 1106 there has been a software cache write issued, then runtime coherence check module performs a runtime coherency check (step 1108), with the operation ending thereafter.

If at step 1104 the DMA operation is a DMA put operation, then the runtime coherence check module determines since the last flush operation if there has been a software cache write issued (step 1110). If at step 1110 there has been a software cache write issued, then runtime coherence check module performs a runtime coherency check (step 1108), with the operation ending thereafter. If at step 1110 there has not been a software cache write issued, then the runtime coherence check module determines since the last flush operation if there has been a software cache read issued (step 1112). If at step 1112 there has not been a software cache read issued, then the runtime coherency operation is skipped and the operation ends. However, if at step 1112 there has been a software cache read issued, then the runtime coherence check module determines if software cache read followed a DMA put operation (step 1114). If at step 1114 the software cache read followed the DMA put operation, then the runtime coherence check module performs a runtime coherency check (step 1108), with the operation ending thereafter. If at step 1114 the software cache read failed to follow a DMA put operation, then the runtime coherency operation is skipped and the operation ends.

Thus, the data flow analysis distinguishes the references by how the references are performed, through software controlled caching or direct buffering. While some data flow may require only forward data flow analysis, other data flows may require both forward and backward data flow analysts.

Thus, in one illustrative embodiment, a mechanism is provided for reducing coherency problems using compile time analysis and runtime coherency maintenance. This illustrative embodiment may use compiler analysis to guarantee that there is no access to software controlled cache after a direct buffer is allocated and before it is freed, and rely on runtime support to update values from or to software controlled cache at the point when the direct buffer is allocated or freed. In another illustrative embodiment a global data flow analysis may be used to reduce runtime coherency checking and overlap computation and DMA accesses to reduce runtime overhead.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reducing coherency problems, the method comprising:
receiving source code that is to be compiled;
analyzing the source code to identify at least one loop of a plurality of loops that contains a memory reference;
determining whether the memory reference is an access to a global memory that should be handled by at least one of a software controlled cache in a local memory or a direct buffer in the local memory;
responsive to an indication that the memory reference is an access to the global memory that should be handled by at least one of the software controlled cache or the direct buffer, determining whether there is a data dependence between the memory reference and at least one reference from at least one of other direct buffers or other software controlled caches; and
responsive to a negative indication of the data dependence, applying a direct buffer transformation to the memory reference in compiled and optimized code so that the direct buffer in the local memory is allocated for the memory reference and no software controlled cache overhead is incurred.

2. The method of claim 1, wherein applying the direct buffer transformation to the memory reference further comprises:
allocating a portion of the local memory for the direct buffer;
inserting at least one data transfer operation into the compiled and optimized code to move data between the direct buffer and the global memory; and
replacing at least one of a load command or a store command to the global memory with at least one of a direct load command or direct store command to the direct buffer at compile time in the compiled and optimized code.

3. The method of claim 1, further comprising:
responsive to a positive indication of the data dependence, transforming the memory reference in the compiled and optimized code into a software cache reference so that the software controlled cache in the local memory is allocated for the software cache; and
transforming in the compiled and optimized code the at least one reference from which the memory reference is dependent into software cache references.

4. The method of claim 3, wherein transforming the memory reference into the software cache reference further comprises:
allocating a portion of the local memory for the software controlled cache; and
inserting a software controlled cache lookup operation for at least one of a load command or a store command to the global memory for the memory reference.

5. The method of claim 1, further comprising:
inserting a call into the compiled and optimized code for a runtime coherency check.

6. The method of claim 5, further comprising:
responsive to the call being issued during execution of the compiled and optimized code, determining whether the call is for at least one of a DMA get operation for the direct buffer or a DMA put operation for the direct buffer;
responsive to the call being the DMA get operation, determining whether data that is to be retrieved by the DMA get operation already exists in the software controlled cache;
responsive to the data existing in the software controlled cache, determining whether any portion of the data that is read into the direct buffer has been modified in the software controlled cache;
responsive to a portion of the data that is read into the direct buffer being modified in the software controlled cache, waiting for the DMA get operation for the direct buffer to finish; and
copying the data from the software controlled cache into the direct buffer.

7. The method of claim 6, further comprising:
responsive to the call being the DMA put operation, determining whether data that is to be retrieved by the DMA put operation already exists in the software controlled cache; and
responsive to the data existing in the software controlled cache, copying the data from the direct buffer into the software controlled cache.

8. A computer program product comprising a non-transitory computer readable medium having a computer readable program recorded thereon, wherein the computer readable program, when executed on a computing device, causes the computing device to:
receive source code that is to be compiled;
analyze the source code to identify at least one loop of a plurality of loops that contains a memory reference;
determine whether the memory reference is an access to a global memory that should be handled by at least one of a software controlled cache in a local memory or a direct buffer in the local memory;
responsive to an indication that the memory reference is an access to the global memory that should be handled by at least one of the software controlled cache or the direct buffer, determine whether there is a data dependence between the memory reference and at least one reference from at least one of other direct buffers or other software controlled caches; and
responsive to a negative indication of the data dependence, apply a direct buffer transformation to the memory reference in compiled and optimized code so that the direct buffer in the local memory is allocated for the memory reference and no software controlled cache overhead is incurred.

9. The computer program product of claim 8, wherein the computer readable program to apply the direct buffer transformation to the memory reference further includes computer readable program that causes the computing device to:
   allocate a portion of the local memory for the direct buffer;
   insert at least one data transfer operation into the compiled and optimized code to move data between the direct buffer and the global memory; and
   replace at least one of a load command or a store command to the global memory with at least one of a direct load command or direct store command to the direct buffer at compile time in the compiled and optimized code.

10. The computer program product of claim 8, wherein the computer readable program further causes the computing device to:
   responsive to a positive indication of the data dependence, transform the memory reference in the compiled and optimized code into a software cache reference so that the software controlled cache in the local memory is allocated for the software cache; and
   transform in the compiled and optimized code the at least one reference from which the memory reference is dependent into software cache references.

11. The computer program product of claim 10, wherein the computer readable program to change the memory reference into the software cache reference further includes computer readable program that causes the computing device to:
   allocate a portion of the local memory for the software controlled cache; and
   insert a software controlled cache lookup operation for at least one of a load command or a store command to the global memory for the memory reference.

12. The computer program product of claim 8, wherein the computer readable program further causes the computing device to:
   insert a call into the compiled and optimized code for a runtime coherency check.

13. The computer program product of claim 12, wherein the computer readable program further causes the computing device to:
   responsive to the call being issued during execution of the compiled and optimized code, determine whether the call is for at least one of a DMA get operation for the direct buffer or a DMA put operation for the direct buffer;
   responsive to the call being the DMA get operation, determine whether data that is to be retrieved by the DMA get operation already exists in the software controlled cache;
   responsive to the data existing in the software controlled cache, determine whether any portion of the data that is read into the direct buffer has been modified in the software controlled cache;
   responsive to a portion of the data that is read into the direct buffer being modified in the software controlled cache, wait for the DMA get operation for the direct buffer to finish; and
   copy the data from the software controlled cache into the direct buffer.

14. The computer program product of claim 13, wherein the computer readable program further causes the computing device to:
   responsive to the call being the DMA put operation, determine whether data that is to be retrieved by the DMA put operation already exists in the software controlled cache; and
   responsive to the data existing in the software controlled cache, copy the data from the direct buffer into the software controlled cache.

15. An apparatus, comprising:
   a processor; and
   a memory coupled to the processor, wherein the memory comprises instructions which, when executed by the processor, cause the processor to:
   receive source code that is to be compiled;
   analyze the source code to identify at least one loop of a plurality of loops that contains a memory reference;
   determine whether the memory reference is an access to a global memory that should be handled by at least one of a software controlled cache in a local memory or a direct buffer in the local memory;
   responsive to an indication that the memory reference is an access to the global memory that should be handled by at least one of the software controlled cache or the direct buffer, determine whether there is a data dependence between the memory reference and at least one reference from at least one of other direct buffers or other software controlled caches; and
   responsive to a negative indication of the data dependence, apply a direct buffer transformation to the memory reference in compiled and optimized code so that the direct buffer in the local memory is allocated for the memory reference and no software controlled cache overhead is incurred.

16. The apparatus of claim 15, wherein the instructions to apply the direct buffer transformation to the memory reference further cause the processor to:
   allocate a portion of the local memory for the direct buffer;
   insert at least one data transfer operation into the compiled and optimized code to move data between the direct buffer and the global memory; and
   replace at least one of a load command or a store command to the global memory with at least one of a direct load command or direct store command to the direct buffer at compile time in the compiled and optimized code.

17. The apparatus of claim 15, wherein the instructions further cause the processor to:
   responsive to a positive indication of the data dependence, transform the memory reference in the compiled and optimized code into a software cache reference so that the software controlled cache in the local memory is allocated for the software cache; and
   transform in the compiled and optimized code the at least one reference from which the memory reference is dependent into software cache references.

18. The apparatus of claim 17, wherein the instructions to transform the memory reference into the software cache reference further cause the processor to:
   allocate a portion of the local memory for the software controlled cache; and
   insert a software controlled cache lookup operation for at least one of a load command or a store command to the global memory for the memory reference.

19. The apparatus of claim 15, wherein the instructions further cause the processor to:
   insert a call into the compiled and optimized code for a runtime coherency check.

20. The apparatus of claim 19, wherein the instructions further cause the processor to:
   responsive to the call being issued during execution of the compiled and optimized code, determine whether the call is for at least one of a DMA get operation for the direct buffer or a DMA put operation for the direct buffer;

responsive to the call being the DMA get operation, determine whether data that is to be retrieved by the DMA get operation already exists in the software controlled cache;

responsive to the data existing in the software controlled cache, determine whether any portion of the data that is read into the direct buffer has been modified in the software controlled cache;

responsive to a portion of the data that is read into the direct buffer being modified in the software controlled cache, wait for the DMA get operation for the direct buffer to finish;

copy the data from the software controlled cache into the direct buffer;

responsive to the call being the DMA put operation, determine whether data that is to be retrieved by the DMA put operation already exists in the software controlled cache; and responsive to the data existing in the software controlled cache, copy the data from the direct buffer into the software controlled cache.

* * * * *